(12) United States Patent
Bowen (10) Patent No.: US 10,708,336 B2
(45) Date of Patent: Jul. 7, 2020

(54) SYSTEM AND METHOD FOR ANNOUNCING MEDIA CHANGES (71) Applicant: Cisco Technology, Inc., San Jose, CA (US)

(72) Inventor: Gareth John Bowen, Chandlers Ford (GB)

(73) Assignee: Cisco Technology, Inc., San Jose, CA (US)

(*) Notice: Subject to any disclaimer, the term of this patent is extended or adjusted under 35 U.S.C. 154(b) by 573 days.

(21) Appl. No.: 15/368,612

(22) Filed: Dec. 4, 2016

(65) Prior Publication Data
US 2018/0159916 A1    Jun. 7, 2018

(51) Int. Cl.
| H04L 29/06 | (2006.01) |
| H04L 29/08 | (2006.01) |
| H04N 21/262 | (2011.01) |
| H04N 21/61 | (2011.01) |
| H04N 21/2187 | (2011.01) |
| H04N 21/845 | (2011.01) |
| H04N 21/643 | (2011.01) |
| H04N 21/482 | (2011.01) |
| H04N 21/462 | (2011.01) |

(52) U.S. Cl.
CPC ............ *H04L 65/608* (2013.01); *H04L 67/02* (2013.01); *H04N 21/2187* (2013.01); *H04N 21/26258* (2013.01); *H04N 21/4621* (2013.01); *H04N 21/4825* (2013.01); *H04N 21/6125* (2013.01); *H04N 21/64322* (2013.01); *H04N 21/8456* (2013.01)

(58) Field of Classification Search
None
See application file for complete search history.

(56) References Cited

U.S. PATENT DOCUMENTS

| 8,578,272 | B2 | 11/2013 | Pantos et al. | |
| 8,892,691 | B2 | 11/2014 | Pantos et al. | |
| 2011/0246621 | A1* | 10/2011 | May, Jr. ............. | H04N 7/17318 709/219 |

(Continued)

FOREIGN PATENT DOCUMENTS

CN    102572555    6/2014

OTHER PUBLICATIONS

IOS-Developer-Library-Timed-Metadata-for-HTTP-Live-Streaming; 2011.
(Continued)

*Primary Examiner* — Natisha D Cox
(74) *Attorney, Agent, or Firm* — Merchant & Gould P.C.

(57) ABSTRACT

In one embodiment, a method, system, and apparatus is described, the method, system, and apparatus including the creation of a dedicated Hypertext Transfer Protocol (HTTP) Live Streaming (HLS) adaptive bitrate (ABR) timed metadata stream which is located at a designated location, the populating the dedicated HLS ABR timed metadata stream with timed metadata items which signal availability of a particular subset of a superset of all media types which are anticipated as being available in streaming media playlists and making the timed metadata items available to an application on a client device. Related methods, systems and apparatus is also described.

18 Claims, 4 Drawing Sheets

(56) References Cited

U.S. PATENT DOCUMENTS

| | | | |
|---|---|---|---|
| 2011/0252118 A1* | 10/2011 | Pantos | H04L 65/4069 |
| | | | 709/219 |
| 2012/0102042 A1* | 4/2012 | Flick | G11B 27/3027 |
| | | | 707/746 |
| 2012/0102078 A1* | 4/2012 | Flick | G06F 16/68 |
| | | | 707/825 |
| 2013/0188016 A1* | 7/2013 | Tsukagoshi | H04N 19/597 |
| | | | 348/43 |
| 2013/0263169 A1 | 10/2013 | Pedlow et al. | |
| 2014/0250383 A1* | 9/2014 | Berger | H04L 51/24 |
| | | | 715/738 |
| 2015/0229695 A1 | 8/2015 | Kim et al. | |

OTHER PUBLICATIONS

Pantos, R., et al.; "HTTP Live Streaming" (draft-pantos-http-live-streaming-19), IETF, Apr. 4, 2016.
Technical Note TN2288; Example Playlist Files for use with HTTP Live Streaming; 2012; available on the web at: https://developer.apple.com/libary/content/technotes/tn2288/_index.html#//apple_ref/doc/uid/DTS40012238.

* cited by examiner

SYSTEM AND METHOD FOR ANNOUNCING MEDIA CHANGES

TECHNICAL FIELD

The present disclosure generally relates to playback of multimedia using adaptive bitrate streaming.

BACKGROUND

Adaptive bitrate (ABR) streaming is a technique used in streaming multimedia content over computer networks. While in the past most video streaming technologies utilized streaming protocols such as Real Time Transport Protocol (RTP) with Real Time Streaming Protocol (RTSP), today's adaptive streaming technologies are almost exclusively based on Hypertext Transfer Protocol (HTTP) and designed to work efficiently over large distributed HTTP networks such as the Internet.

ABR clients operate by detecting a user's bandwidth and central processing unit capacity in real time and adjusting the quality of a video stream accordingly. ABR servers typically utilize the use of an encoder which encodes a single source video at multiple bit rates. An ABR client (i.e. a "player") switches between playing the different encoded streams depending on available resources. Typically, ABR results in streaming video transmissions with very little buffering, fast start time and a good experience for both high-end and low-end connections.

The player is able to access the available streams at differing bit rates, and segments of the streams by accessing a master playlist. In some cases, when starting, the client requests the segments from the lowest bit rate stream. Other strategies may be used depending on the desired user experience. If the client finds the download speed is greater than the bit rate of the segment downloaded, then it may request higher bit rate segments. Later, if the client finds the download speed for a segment is lower than the bit rate for the segment, and therefore the network throughput has deteriorated, then it may request a lower bit rate segment. The segment size can vary depending on the particular implementation, but is typically between two (2) and ten (10) seconds.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a method, system, and apparatus is described, the method, system, and apparatus including the creation of a dedicated Hypertext Transfer Protocol (HTTP) Live Streaming (HLS) adaptive bitrate (ABR) timed metadata stream which is located at a designated location, the populating the dedicated HLS ABR timed metadata stream with timed metadata items which signal availability of a particular subset of a superset of all media types which are anticipated as being available in streaming media playlists and making the timed metadata items available to an application on a client device. Related methods, systems and apparatus is also described.

Example Embodiment

Figure 1:
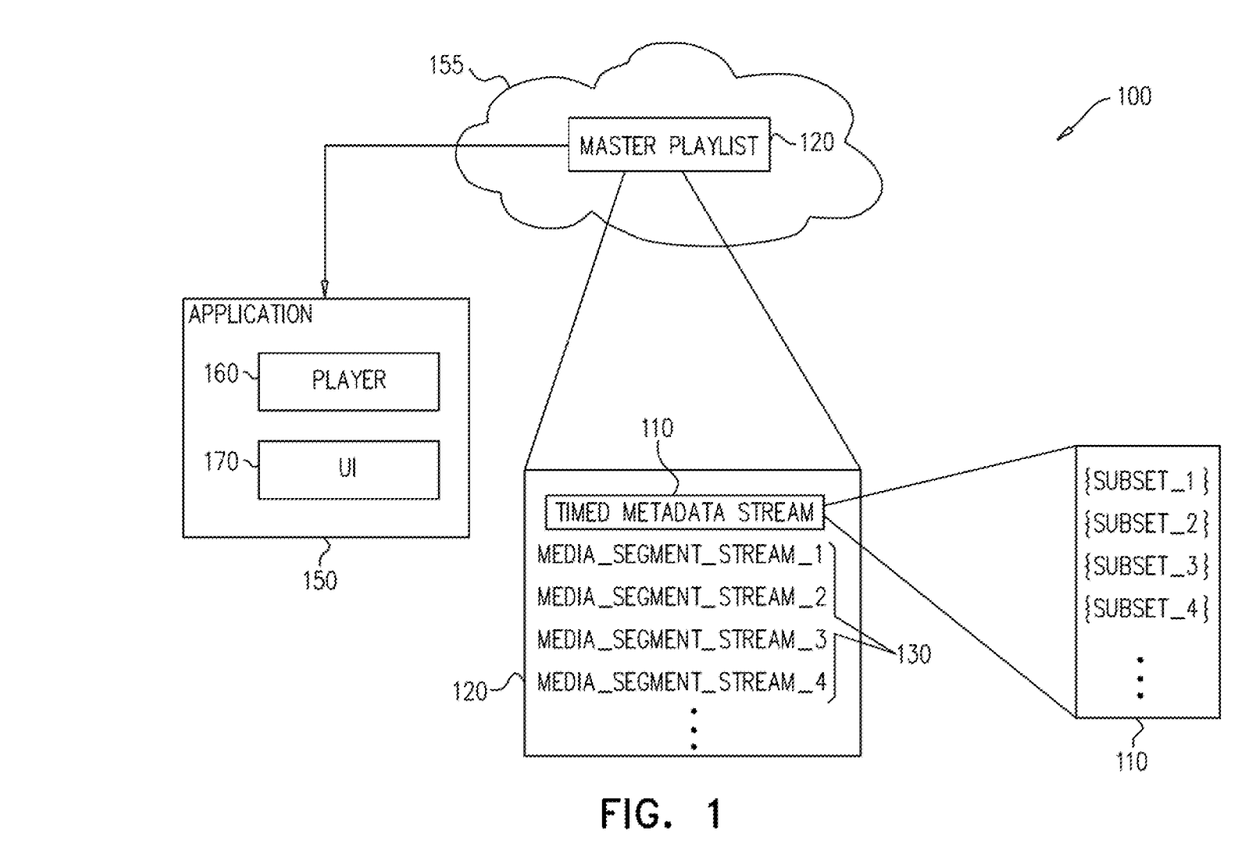
FIG. 1 is a simplified pictorial illustration of a system for adaptive bitrate streaming using timed metadata to announce media changes in live HLS content, the system constructed and operative in accordance with an embodiment of the present invention.

Reference is now made to FIG. 1, which is a simplified pictorial illustration of a system 100 for adaptive bitrate (ABR) streaming using timed metadata, delivered in a dedicated timed metadata stream 110 to announce media changes in live Hypertext Transfer Protocol (HTTP) Live Streaming (HLS) content, the system 100 constructed and operative in accordance with an embodiment of the present disclosure. HLS is an HTTP-based media streaming communications protocol defined by Apple Inc. HLS is implemented by many stake-holders in the ABR environment.

In a typical HLS workflow, a video encoder (not depicted) that supports HLS receives a live video feed or distribution-ready media file. The encoder creates multiple versions (known as variants) of the video (and possibly audio) at different bit rates, resolutions, and quality levels. The encoder then segments the variants into a series of small files, called media segments. At the same time, the encoder creates a media playlist file for each variant containing a list of a URIs (uniform resource identifier), and/or URLs (uniform resource locator), which point to the variant's media segments. The encoder also creates a master playlist file 120, containing a list 130 of the URLs or URIs to variant media playlists, and descriptive tags to control the playback behavior of the stream. The master playlist enables describing a complex presentation in the HLS stream. Specifically, the master playlist may provide a set of variant streams, each of which describes a different version of the same content. Each of the variant streams may include a media playlist that specifies media encoded at a particular bit rate, in a particular format, and at a particular resolution for media containing video. A variant stream can also specify a set of renditions. Renditions are alternate versions of the content, such as audio produced in different languages or video recorded from different camera angles. It is appreciated that in FIG. 1 the timed metadata stream 110 is shown as referenced in the master playlist file 120, the timed metadata stream 110 may, in fact be located at any one of a number of designated locations, that is to say, one of:

- a location designated by an entry added in an HLS ABR master playlist 120;
- a location designated by an entry added in an HLS ABR media playlist (i.e. one of the lists 130); or
- a location embedded in a stream of media segments, i.e. one of the media segments referred to by one of the lists 130.

While producing playlists and segments, the encoder or automated scripts upload the files to a web server or content delivery network (CDN). Those of skill in the art will appreciate that audio (whether the audio is a sound track associated with the video, or the audio is a streaming audio file independent of any associated video) is typically handled in HLS in a manner similar to that described above for video.

In typical cases, audio and subtitles are to be carried in their own segments as alternate streams for different renditions, as recommended in HLS. However, it is appreciated that audio and subtitles may be carried in the video segments within a transport stream (TS). It is appreciated that the present specification and claims refer to the typical, recommended case.

Figure 2:
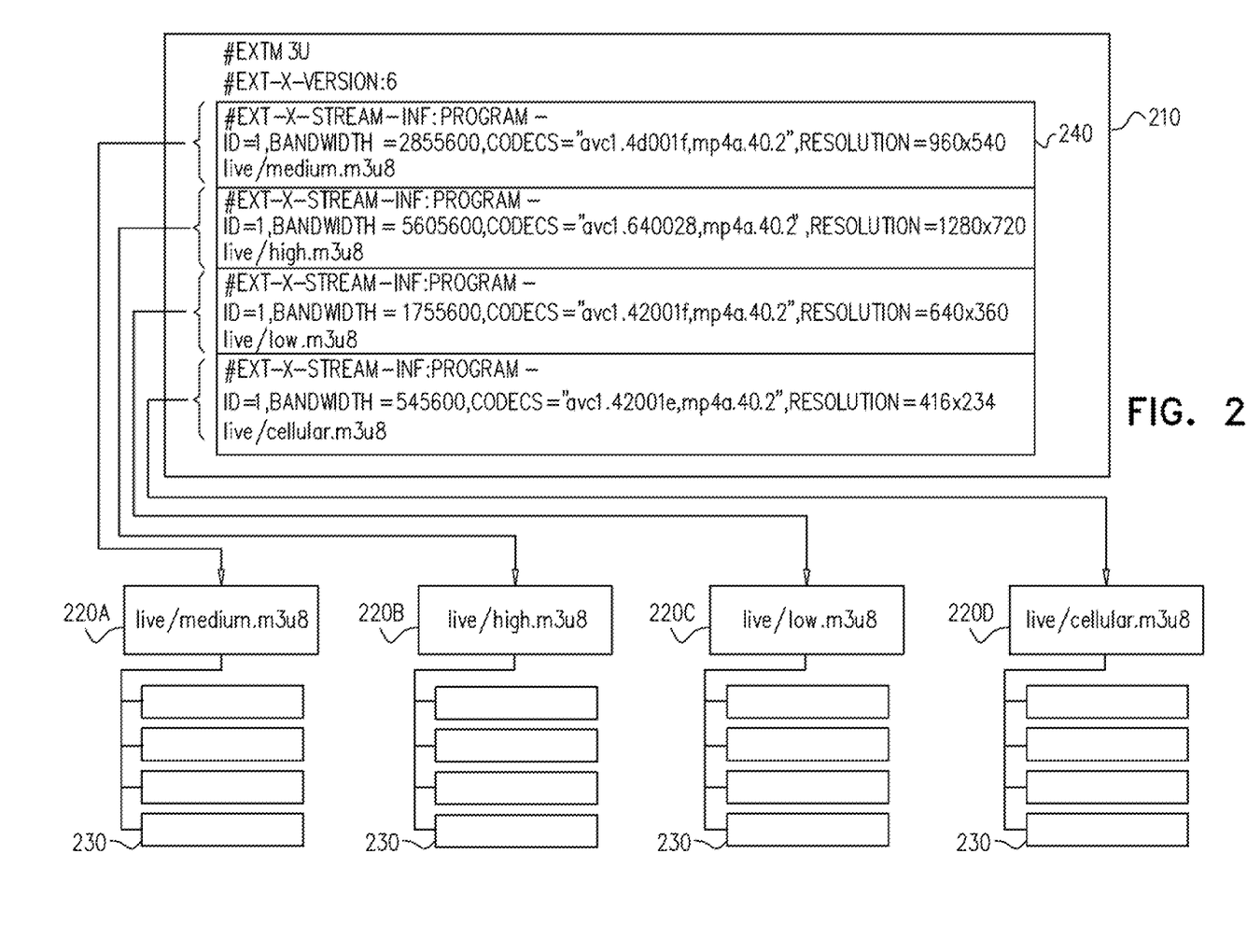
FIG. 2 is a graphic depiction of the relations between a master playlist, media playlists, and media segment files.

Reference is now briefly made to FIG. 2, which is a graphic depiction of the relations between a master playlist 210, media playlists 220A-220C, and media segment files 230. A master playlist 210, which may be exemplary of master playlist 120 of FIG. 1, is depicted. The master playlist 210 provides details such as bandwidth, codec, and resolution for each individual media playlist in the stream. The master playlist also provides an address, such as a URI or URL, typically a location of a file on a web server, for each individual media playlist in the stream. Taking, by way of example, one entry 240 in the master playlist 210:

\# EXT-X-STREAM-INF:PROGRAM-ID=1, BANDWIDTH=2855600, CODECS="avc1.4d001f,mp4a.40.2", RESOLUTION=960×540
live/medium.m3u8

The exemplary entry 240 provides the following information:

| | |
|---|---|
| Bandwidth | 2855600 (bits per second) |
| Codec | avc1.4d001f, mp4a.40.2 |
| Resolution | 960 × 540 |
| Location | live/medium.m3u8 |

Persons of skill in the art will understand the parameters in the examples provided in the exemplary entry 240 and the other entries in the exemplary master playlist 210.

The master playlist 210 provides information about four different variants of a live streamed video event. The first, as mentioned above, leads to media playlist 220A, which is, in the present example, live streamed video of a medium resolution and bandwidth (note that "high", "medium", and "low", are by way of comparison with the other options provided in the master playlist 210). Media playlist 220A provides locations for its respective media segment files 230. Similarly, media playlist 220B, is, in the present example, live streamed video of a high resolution and bandwidth. Media playlist 220B provides locations for its respective media segment files 230. Likewise, media playlist 220C, is, in the present example, live streamed video of a low resolution and bandwidth. Media playlist 220C provides locations for its respective media segment files 230. Finally, media playlist 220D, is, in the present example, live streamed video of a resolution and bandwidth adapted for cellular devices. Media playlist 220D provides locations for its respective media segment files 230. The master playlist 210 may also provide URIs or URLs for alternate streams of subtitles and audio streams which will be made available over time.

Returning now to the discussion of FIG. 1, access may be provided to the master playlist 120 at a client device by an application 150 hosting a player 160 which in turn downloads the master playlist, or by embedding a link in a webpage accessed by the application 150 hosting the player 160, which leads to the master playlist 120 file, or, or through any other appropriate mechanism, such as are known in the art. The master playlist 120 is depicted as being available for download to the application 150 in a network 155. It is appreciated that the master playlist may be provided to the application 150 via being directly loaded to a client device on which the application 150 is resident (e.g. via a USB storage device), or some other method as will be appreciated by those of skill in the art. The player 160 is typically able to switch between different variant streams (as described above) in order to adapt to network conditions. Additionally, the application 150 either automatically, e.g. based on a pre-set user preference, or via a user interface (UI) 170 enables a user to select among various renditions, i.e. alternate versions of the content, as exposed by the player 160 from the master playlist 120.

HLS does not does not require that the player 160 refresh the master playlist 120. For live content, this means that the set of available renditions may be fixed for the time that the channel is on air. This may be problematic when certain types of alternate media changes on-the-fly. For example, a movie may have both stereo and a surround audio track while the rest of the content on the same channel as the movie only has a stereo audio track. Or, a news broadcast may have forced subtitles. When users try to select their preferred media and that preferred media ends for whatever reason (e.g., it is over, or the feed ends, etc.), end user experience is impacted negatively. On the other hand, if a user is viewing content in a format which is not the user's media preferred format, and the preferred media becomes available, the user does not necessarily have a way of becoming aware of the availability of the preferred format. Accordingly, a mechanism which signals to the user that media availability is changing without dependency upon the master playlist 120 would be a desirable feature. Such a mechanism would, ideally, work independently of client devices regardless of an underlying player 160 of the client device.

HLS provides mechanisms for delivering the timed metadata stream 110 which is carried in an elementary stream (e.g., PES, i.e. Packetized Elementary Stream, part of the MPEG-2 part 1 communication protocol, ISO/IEC 13818-1) instead of, for example, in a carousel. The dedicated timed metadata stream 110 maps to the same presentation timeline as does the main program material (i.e. typically the video content) to which the timed metadata relates.

In some embodiments, the dedicated timed metadata stream 110 may be added to the video media segments in the ABR elementary stream allowing events to be signaled from the stream to the application 150 hosting the player 160. As of HLS version 7, timed metadata can now be included directly in the media playlists. Aside from the generic examples provided in the master playlist 210 of FIG. 2 above, there are tags used in master playlists for different encodings and tags for different media groups. The master playlist 120 would utilize these tags in order to list all renditions it is anticipated at any time will ever be available for the channel (i.e. the master playlist 120 provides the player 160 which in turn provides the application 150 a superset of all subtitles and audio streams which will be made available over time for the channel). That is to say, that the superset of all of the variant streams and renditions is made available to the application 150.

The following, designated Master Playlist 1, is an exemplary superset master playlist:

| Master Playlist 1 |
|---|
| #EXTM3U<br>#EXT-X-MEDIA:TYPE=AUDIO,GROUP-ID="the_audio", \\<br>LANGUAGE="eng",NAME="English",AUTOSELECT=YES, \\<br>DEFAULT=YES, URI="eng/prog_index.m3u8" |

-continued

Master Playlist 1

EXT-X-MEDIA:TYPE=AUDIO,GROUP-ID="the_audio", \
LANGUAGE="fre",NAME="Francais",AUTOSELECT=YES, \
DEFAULT=NO,URI="fre/prog_index.m3u8"
EXT-X-MEDIA:TYPE=AUDIO,GROUP-ID="the_audio", \
LANGUAGE="sp",NAME="Espanol",AUTOSELECT=YES, \
DEFAULT=NO,URI="sp/prog_index.m3u8"
EXT-X-STREAM-INF:PROGRAM-ID=1,BANDWIDTH=195023, \
CODECS="avc1.42e00a,mp4a.40.2",AUDIO="the_audio"
lo/prog_index.m3u8
EXT-X-STREAM-INF:PROGRAM-ID=1,BANDWIDTH=591680, \
CODECS="avc1.42e01e,mp4a.40.2",AUDIO="the_audio"
hi/prog_index.m3u8

The above example shows how the superset master playlist provides three renditions, each one of which is for a single video stream with audio produced in three different languages (i.e. English, French, and Spanish). In this example, the three # EXT-X-MEDIA tags define a single group. In this particular case, the groups is assigned a group ID named "the_audio", and the type of the group is AUDIO. It is appreciated that type is a string which, at present, may be one of: AUDIO, VIDEO, SUBTITLES and CLOSED-CAPTIONS. However, the method and system described herein will work with other types which might be added in the future, either as part of the HLS standard, or as proprietary types. Each entry in the "Audio" group is uniquely identified by its name, e.g., "English", "Français", and "Espanol". The two video entries (X-STREAM-INF) are associated with the group through the matching TYPE attribute (specifically AUDIO="the audio"). The application 150 will be able to choose one of the three members of the group (AUDIO) to play.

There can be multiple groups of different types (video, subtitles). Groups can distinguish codecs (e.g. AAC v AC-3 audio) or encoding rates as well as languages. Thus, the superset of media available may be viewed as all the members of every group. Accordingly, every entry in the master playlist can be uniquely identified by a combination of its type, group-id and name. A dot-notation will be used herein in order to reference any entry by: NAME.TYPE.GROUP-ID. For example, the Spanish language entry above may therefore be referenced as "Espanol.AUDIO.the_audio". Although the language may not be needed in the dot-notation, it is nonetheless possible to extend the notation so that language is also included: "es.Espanol.AUDIO.the_audio".

The timed metadata may comprise either: a list of available group entries; or a list of entries that are not present (in which case it is up to the packager to determine what is the most efficient way to describe current availability). For example, if only the English language is missing, then the timed metadata could (logically) contain either (but not both):

"Available=(Français|Espanol).AUDIO.the_audio"; or

"Missing=English.AUDIO.the_audio"

Consider the following exemplary superset master playlist, designated Master Playlist 2, with AUDIO and SUBTITLES for Swedish and Danish:

Master Playlist 2

EXTM3U
EXT-X-MEDIA:TYPE=AUDIO,GROUP-ID="audio", \
LANGUAGE="swe",NAME="Swedish",AUTOSELECT=YES, \
DEFAULT=YES,URI="swe/prog_index.m3u8"
EXT-X-MEDIA:TYPE=AUDIO,GROUP-ID="audio", \
LANGUAGE="dan",NAME="Danish",AUTOSELECT=YES, \
DEFAULT=NO,URI="dan/prog_index.m3u8"
EXT-X-MEDIA:TYPE=SUBTITLES,GROUP-ID="subs", \
LANGUAGE="swe",NAME="Swedish",AUTOSELECT=YES, \
DEFAULT=NO,URI="swe/sub_index.m3u8"
EXT-X-MEDIA:TYPE=SUBTITLES,GROUP-ID="subs", \
LANGUAGE="dan",NAME="Danish",AUTOSELECT=YES, \
DEFAULT=NO,URI="dan/sub_index.m3u8"
EXT-X-STREAM-INF:PROGRAM-ID=1,BANDWIDTH=195023, \
CODECS="avc1.42e00a,mp4a.40.2",AUDIO="audio", \
SUBTITLES="subs"
lo/prog_index.m3u8
EXT-X-STREAM-INF:PROGRAM-ID=1,BANDWIDTH=591680, \
CODECS="avc1.42e01e,mp4a.40.2",AUDIO="audio", \
SUBTITLES="subs"
hi/prog_index.m3u8

Exemplary Master Playlist 2 inherently defines the superset as both languages (Swedish and Danish) for both media types (i.e., having Swedish and Danish subtitles). Accordingly, the following exemplary media playlist 3 containing a list of segments is provided below:

Media Playlist 3 segment1.ts -> "Available=Swedish.AUDIO.audio&Danish.SUBTITLES.subs"
segment2.ts -> "Available=Swedish.AUDIO.audio&Danish.SUBTITLES.subs"
segment3.ts -> "Available=Swedish.AUDIO.audio&Danish.SUBTITLES.subs"
segment4.ts -> "Available=Swedish.AUDIO.audio&Danish.SUBTITLES.subs"
segment5.ts -> "Available=Swedish.AUDIO.audio&Danish.SUBTITLES.subs"
segment6.ts -> "Available=Danish.AUDIO.audio&Swedish.SUBTITLES.subs"
segment7.ts -> "Available=Danish.AUDIO.audio&Swedish.SUBTITLES.subs"
segment8.ts -> "Available=Danish.AUDIO.audio&Swedish.SUBTITLES.subs"
segment9.ts -> "Available=Danish.AUDIO.audio&Swedish.SUBTITLES.subs"
segmentA.ts -> "Available=Danish.AUDIO.audio&Swedish.SUBTITLES.subs"
segmentB.ts -> "Available=Swedish.AUDIO.audio&Danish.SUBTITLES.subs"

The → symbol above is used to indicate that there is a timed metadata entry within the .ts file with the availability as described. The timed metadata may typically comprise other fields as well, including presentation timestamp (PTS). These fields have been omitted from Exemplary Master Playlist 2 and media playlist 4 for the sake of clarity. Thus, from segment1.ts to segment5.ts, the active audio is Swedish and the active subtitles are Danish. However. from segment6.ts to segmentA.ts, the active audio is Danish and the active subtitles is Swedish. It is appreciated that availability can be specified more efficiently within a transport stream (TS) using bit fields instead of a text string, for example, a 1 bit flag could indicate availability instead of the string "Available=".

In the case of timed metadata within the media playlist, the availability string used in the example above can be included in the X-<client-attribute> attribute of the EXT-X-DATERANGE tag. An example media playlist using the transitions from the previous example but demonstrating the use of this tag is provided below:

---
Media Playlist 4
---
EXT-X-DATERANGE:CLASS="media-availability",X-AVAILABLE="Swedish.AUDIO.audio&Danish.SUBTITLES.subs"
segment1.ts
segment2.ts
segment3.ts
segment4.ts
segment5.ts
EXT-X-DATERANGE:CLASS="media-availability",X-AVAILABLE="Danish.AUDIO.audio&Swedish.SUBTITLES.subs"
segment6.ts
segment7.ts
segment8.ts
segment9.ts
segmentA.ts
EXT-X-DATERANGE:CLASS="media-availability",X-AVAILABLE="Swedish.AUDIO.audio&Danish.SUBTITLES.subs"
segmentB.ts
---

The CLASS tag used in Media Playlist 4 is defined in the HLS specification as being defined by an implementer. Accordingly, the example in Media Playlist 4 provides an example class, i.e., "media-availability". For this class, the "X-AVAILABLE" attribute is used to specify a list of active media. Conversely, the "X-MISSING" attribute could be used to specify a list of media that is not active. The exemplary CLASS tags provided herein should not be considered prescriptive tags; any other tag names could work following the principles described herein. It is also appreciated, in all of the exemplary playlists that for the sake of clarity, certain tags, which might include required tags, have been omitted.

The application 150 registers with the player 160 to receive the dedicated timed metadata stream 110 from an ABR channel. As the player 160 starts processing media, the ABR channel sends the associated timed metadata items to the application 150 and these items carried in the dedicated timed metadata stream 110 indicate which subset of media types in the superset is active. At the start of each media segment (such as would be associated with one of media_segment_stream_1, media_segment_stream_2, media_segment_stream_3, and so forth, of master list 120) timed metadata in the dedicated timed metadata stream 110 specifies which subset of the media streams are actually active. Specifically, and by way of example, subset_1 in the dedicated timed metadata stream 110 specifies specify which subset of the media streams are actually active at the start of media_segment_stream_1; subset_2 in the dedicated timed metadata stream 110 specifies specify which subset of the media streams are actually active at the start of media_segment_stream_2; and so forth. When carried in the media itself, the timed metadata is carried in PES. In each PES header, there is a presentation timestamp (PTS) which allows the player to deliver the associated timed metadata at the corresponding point in the video. When carried within the media playlists, the timed metadata is synchronized via the date range mechanism. It is appreciated that in the future, the HLS standard might be modified to add new mechanisms for synchronizing timed metadata (e.g. timed metadata might be referenced from the master playlist) so, generally, any binding of timed metadata to timeline would be appropriate.

The list of options of available media types, subtitles, and so forth may be made available to the UI 170 of the application 150 at the start of each media segment, so that the user is able to select a preferred option from among the subset of available media options. If the user then tries to change the active media stream (e.g. by selecting a different language, resolution, bandwidth, etc.), only the subset of available options is displayed on the UI 170, rather than showing the full superset.

Additionally, in some embodiments, in the same way as MPEG-2 transport stream (TS) program specific information (PSI) is provided with version identification stamps, the timed metadata could be provided with version identification stamps, so that the application 150 can track versions of the timed metadata. Providing versioning in the metadata enables the application 150 to easily detect a change in availability without inspecting the metadata itself. Whether versioning is provided or not, any change in availability allows the application 150 to take an action when the previously selected media is no longer available. For example, the application 150 may invoke a preconfigured selection (e.g., if subtitles are no longer available in French, then display the media without subtitles). Alternatively, the application 150 may use the UI 170 in order to prompt the user to select a new or different media type, as either an previous selection is no longer available, or alternatively, a new, and possibly preferred media type has become available. In some embodiments, the application 150 may be preconfigured to automatically switch to a user preferred media type if and when that type of media becomes available.

In some embodiments, player 160 may not be modifiable. In order to operate with HLS and un-modifiable players, the embodiments described herein do not assume any visibility of the master playlist 120 to the application 150, nor that a fetch of the master playlist 120 is possible. Even if it were possible for the application 150 to execute a fetch of the master playlist 120, the fetch might not affect the player 160. Once the player 160 has begun playing media items, the player 160 may not be able to switch to a different version of the media stream without itself being refreshed and/or reset. Those of skill in the art will appreciate that the approach taken in the embodiments described herein differs from that used in Dynamic Adaptive Streaming over HTTP (DASH). In DASH, an event stream can instruct the player 160 to re-acquire the manifest in order to see what media is available (it is appreciated that a DASH manifest is substantively equivalent to an HLS master playlist 120, however, DASH can express media availability changing over time whereas HLS cannot). Accordingly, the embodiments described herein utilize HLS normally to signal in the master list 120 the anticipated superset of all content and the timed metadata carried in the dedicated timed metadata stream 110 lists the active subset of all content.

It is appreciated that embodiments described herein enable management of media availability at the application 150 level. The user is only presented with active media, and thus, it is not likely that the user will be confused by options which are not currently active. Accordingly, a user experience is provided which is more consistent with non-ABR broadcast systems. Since recent ABR protocols are built upon the principle of dumb file servers and caches, requiring custom HLS aware capability in the server may not be appropriate. Additionally, embedding the availability of media items within timed metadata ensures synchronization of availability with the content as the content is explicitly positioned on a presentation timeline, as discussed above with reference to presentation timestamps (PTS) or date range, or, in future versions of the HLS standard, any future appropriate synchronization mechanism.

Media consumption is becoming increasingly non-linear. Media that can be interacted with by the consumer, such as by selecting television shows to watch through a video on demand type service, by playing a video game, by clicking through a website, or by interacting through social media. Non-linear media is a move away from traditional linear media, in which content is selected by the publisher to be consumed and is then done so passively. There is no single specific form of non-linear media; rather, what might be considered non-linear changes as technology changes. As media consumption becomes non-linear, synchronization of availability change becomes more complex for an out-of-stream approach; embedding notifications in the dedicated timed metadata stream 110 in the content enables synchronization even for time-shifted content. Additionally, changes in the availability of content can be quickly signaled by the broadcaster by embedding notifications of the changes as timed metadata as new media segments are produced and made available.

Furthermore, while not necessarily an ideal solution for every circumstance, adding one TS packet for the timed metadata to each video segment is not a large overhead. For large viewing populations, leveraging the mechanisms to scale the video distribution requires little (if no) additional deployment effort. For such a broadcast scenario, adding a single TS packet seems reasonable. Furthermore, the use of timed metadata in the media playlists can avoid this overhead within the media itself.

Figure 3:
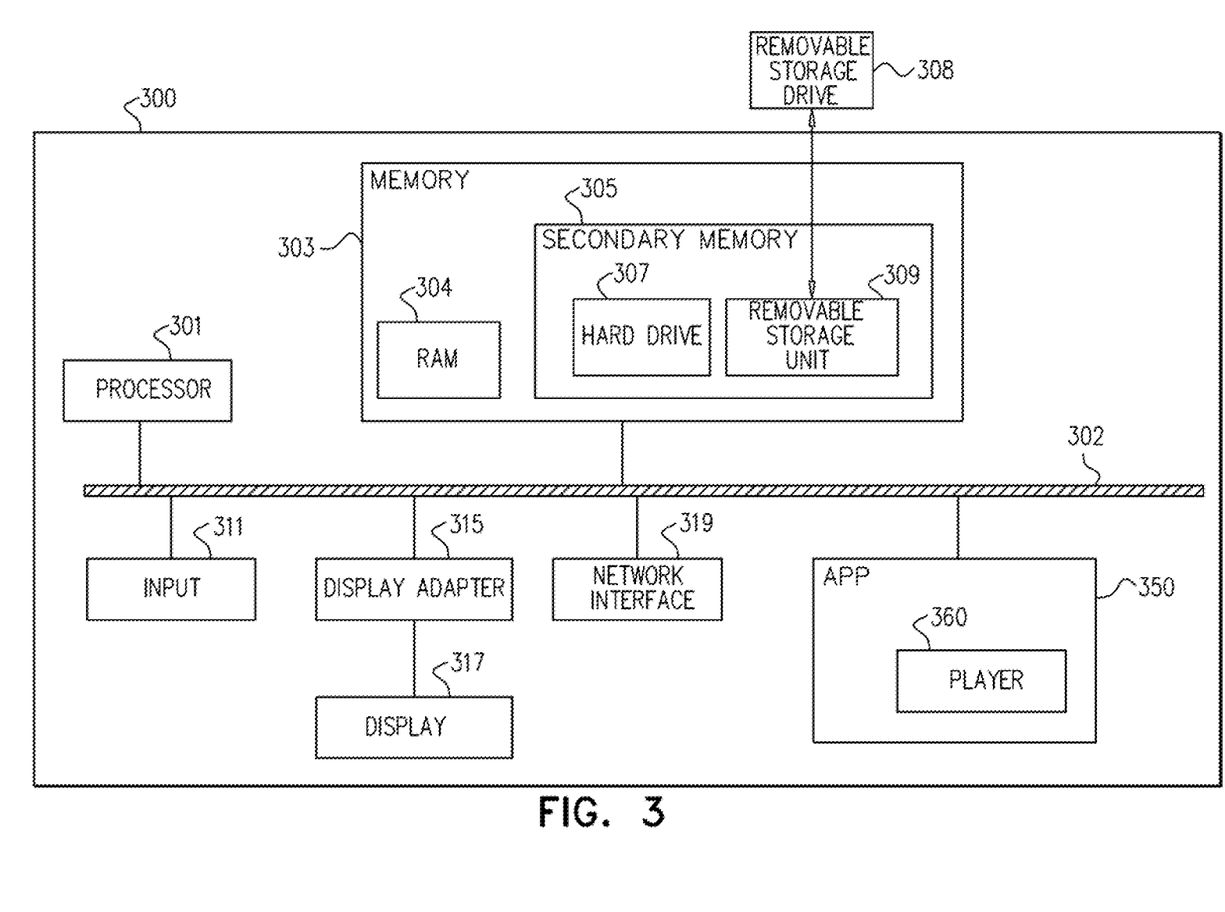
FIG. 3 is a block diagram of an exemplary client device comprising an application and player of FIG. 1.

Reference is now made to FIG. 3, which is a block diagram of an exemplary client device 300 comprising the application 150 and player 160 of FIG. 1 (now depicted as application 350 and player 360). The client device 300 is suitable for implementing any of the systems, methods or processes described above. The client device 300 comprises one or more processors, such as processor 301, providing an execution platform for executing machine readable instructions such as software. One of the processors 301 may be a special purpose processor operative to perform the method for announcing media changes as described herein above.

Commands and data from the processor 301 are communicated over a communication bus 302. The system 300 also includes a main memory 303, such as a Random Access Memory (RAM) 304, where machine readable instructions may reside during runtime, and a secondary memory 305. The secondary memory 305 includes, for example, a hard disk drive 307 and/or a removable storage drive 308, representing a floppy diskette drive, a magnetic tape drive, a compact disk drive, etc., or a nonvolatile memory where a copy of the machine readable instructions or software may be stored. The secondary memory 305 may also include ROM (read only memory), EPROM (erasable, programmable ROM), EEPROM (electrically erasable, programmable ROM). In addition to software, data representing any one or more of the master playlist 120 (FIG. 1), media playlists 220A-D (FIG. 2), and media segment files 230 (FIG. 2), or any of the timed metadata carried in the dedicated timed metadata stream 110 of FIG. 1, or other similar data may be stored in the main memory 303 and/or the secondary memory 305. The removable storage drive 308 reads from and/or writes to a removable storage unit 309 in a well-known manner.

A user can interface with the system 300 via the user interface which includes input devices 311. such as a touch screen, a keyboard, a mouse, a stylus, and the like in order to provide user input data. A display adaptor 315 interfaces with the communication bus 302 and a display 317 and receives display data from the processor 301 and converts the display data into display commands for the display 317.

A network interface 319 is provided for communicating with other systems and devices via a network (such as network 155 of FIG. 1). The network interface 319 typically includes a wireless interface for communicating with wireless devices in the wireless community. A wired network interface (e.g. an Ethernet interface) may be present as well. The client device 300 may also comprise other interfaces, including, but not limited to Bluetooth, and HDMI.

An application 350, such as application 150 of FIG. 1 may be among the software executed by the processor 301. By way of example, the application may be a web browser. An media player 360, such as player 160 of FIG. 1 may be embedded in the application 350. The user may interact with an the application 350 and media player 360 via the input devices 311 and the display 317.

It will be apparent to one of ordinary skill in the art that one or more of the components of the client device 300 may not be included and/or other components may be added as is known in the art. The client device 300 shown in FIG. 3 is provided as an example of a possible platform that may be used, and other types of platforms may be used as is known in the art. One or more of the steps described above may be implemented as instructions embedded on a computer readable medium and executed on the client device 300. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

At an HTTP Live Streaming (HLS) ABR headend, an HTTP Live Streaming (HLS) ABR master playlist is prepared, and an entry is added to the ABR master playlist for a timed metadata stream. The timed metadata stream is created and located at a URI, a URL, or other appropriate location designated in the ABR master playlist as being the location of the timed metadata stream. The timed metadata may be included in the media segments as a PES or, alternatively, may be referenced in media playlists. The timed metadata stream is populated with timed metadata items which signal to a receiving user device application (e.g. application 350) on a client device (such as client device 300, FIG. 3) that media availability is changing. For example, subtitles may be available for media segments in a given stream prior to a given time and then after the given time subtitles are no longer available for media segments in the given stream. The change of availability of subtitles may be signaled to the application (e.g. application 350) in a timed metadata item in the timed metadata stream. The stream with the subtitles itself, however, will be listed in the master playlist for the duration of the channel playout The ABR master playlist is made available to applications (e.g. application 350) on various client devices, as is known in the art. A client device accesses a media stream according to the stream's media playlist in the ABR master playlist. The timed metadata stream is made available to client devices comprising an application (e.g. application 350) registered with the player to receive the timed metadata stream. When a timed metadata item arrives at the application (e.g. application 350), the application enables selection of media type on the basis of media availability as signaled in the received timed metadata.

Although FIG. 3 describes the exemplary client device 300, it is appreciated that similar components may be disposed on a device, such as a server (not depicted) at an ABR headend. A processor disposed at such a server may create a dedicated timed metadata stream which is located at one designated location, that is to say, one of:

a location designated by an entry added in an HLS ABR master playlist;

a location designated by an entry added in an HLS ABR media playlist; or a location embedded in a stream of media segments.

The processor may then populate the dedicated timed metadata stream with timed metadata items which signal to an application on a client device that a particular subset of media is available. The server may then utilize its network interface to make the timed metadata items available to the application 350 on the client device 300.

Figure 4:
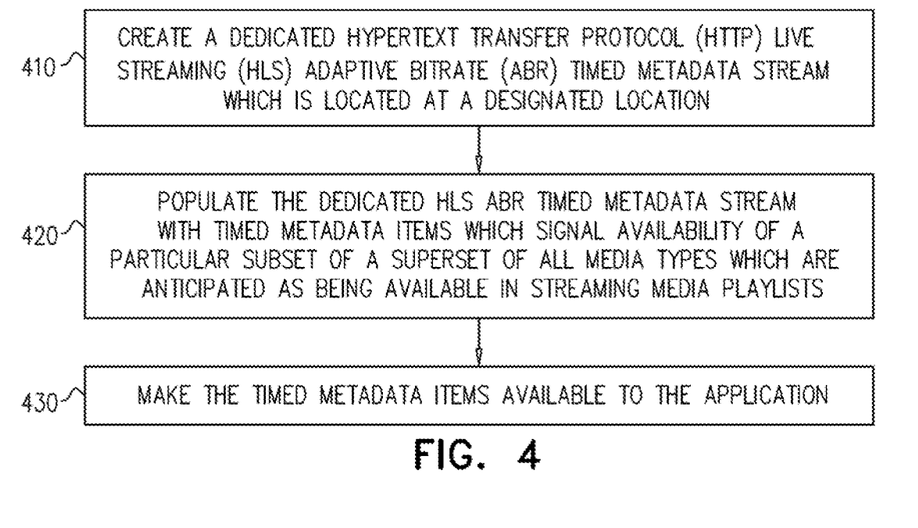
FIG. 4 is a simplified flow chart diagrams of one method for a first embodiment of the of the system FIG. 1.

Reference is now made to FIG. 4, which is a simplified flow chart diagrams of one method for a first embodiment of the of the system FIG. 1. At step 410 a dedicated HTTP ABR timed metadata stream (such as dedicated timed metadata stream 110) is created, the dedicated HTTP ABR timed metadata stream being located at a designated location. At step 420 the dedicated HLS ABR timed metadata stream is populated with timed metadata items which signal availability of a particular subset of a superset of all media types which are anticipated as being available in streaming media playlists.

At step 430, the signaling timed metadata items are made available to the application.

Figure 5:
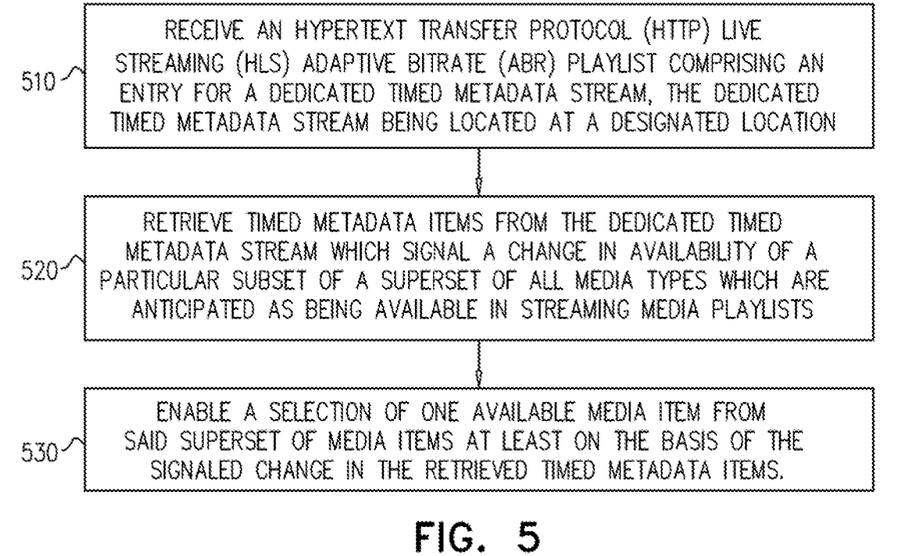
FIG. 5 is a simplified flow chart diagrams of one method for a second embodiment of the of the system FIG. 1.

Reference is now made to FIG. 5, which is a simplified flow chart diagrams of one method for a second embodiment of the of the system FIG. 1. At step 510 an HLS ABR playlist comprising an entry for a dedicated timed metadata stream is received at an application (such as the application 150) on the client device (such as the client device 300). The dedicated timed metadata stream is located at a designated location.

At step 520 the timed metadata items are retrieved from the dedicated timed metadata stream which signal a change in availability of a particular subset of a superset of all media types which are anticipated as being available in streaming media playlists.

At step 530 selection of one available media item from the superset of media items is enabled, at least on the basis of the signaled change in the retrieved timed metadata items.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:

creating a dedicated Hypertext Transfer Protocol (HTTP) Live Streaming (HLS) adaptive bitrate (ABR) timed metadata stream which is located at a designated location;

populating the dedicated HLS ABR timed metadata stream with timed metadata items, the timed metadata items specifying availability of a particular subset of a superset of all media types which are anticipated as being available at start of a media segment in streaming media playlists, wherein the timed metadata items further specify a change in availability of another particular subset of the superset of all media types which are anticipated as being available at start of another media segment in streaming media playlists, and wherein the timed metadata is synchronized with timeline of a the streaming media playlist; and making the timed metadata items available to an application on a client device, wherein making the times metadata items available comprises displaying, by an application on a client device, a list of available media items at least on the basis of the signal of the change in availability of the particular subset of the superset of all media types which are anticipated as being available in streaming media playlists.

2. The method according to claim 1 wherein the timed metadata items signal that the particular subset of the superset comprises media types which are available at a given time.

3. The method according to claim 1 wherein the designated location comprises at least one of the following:

a location designated by an entry added in an HLS ABR master playlist;

a location designated by an entry added in an HLS ABR media playlist; and a location embedded in a stream of media segments.

4. The method according to claim 3 wherein the HLS ABR master playlist comprises entries designated as a group indicating the superset which is made locatable by the HLS ABR master playlist.

5. The method according to claim 3 wherein the timed metadata stream made locatable by the HLS ABR master playlist comprises an indication of the particular subset in the superset of all media types which is now available.

6. The method according to claim 1 wherein the timed metadata stream is provided with version identification stamps.

7. A non-transient computer-readable medium that stores a set of instructions when executed perform a method executed by the set of instructions comprising:

receiving a Hypertext Transfer Protocol (HTTP) Live Streaming (HLS) adaptive bitrate (ABR) playlist comprising an entry for a dedicated timed metadata stream, the dedicated timed metadata stream being located at a designated location;

retrieving timed metadata items from the dedicated timed metadata stream, the timed metadata items specifying availability of a particular subset of a superset of all media types which are anticipated as being available at start of a media segment in streaming media playlists, the timed metadata items further specifying a change in availability of another particular subset of the superset of all media types which are anticipated as being available at start of another media segment in the streaming media playlists, wherein the timed metadata is synchronized with timeline of a the streaming media playlist; and enabling a selection of one available media item from said superset of media items at least on the basis of the signaled change in the retrieved timed metadata items, wherein the enabling the selection of one available media item comprises displaying, by an application on a client device, a list of available media items at least on the basis of the signal of the change in availability of the particular subset of the superset of all media types which are anticipated as being available in streaming media playlists.

8. The non-transient computer-readable medium according to claim 7 wherein the designated location comprises at least one of the following:

a location designated by an entry added in an HLS ABR master playlist;

a location designated by an entry added in an HLS ABR media playlist; and a location embedded in a stream of media segments.

9. The non-transient computer-readable medium according to claim 8 wherein the HLS ABR master playlist comprises entries designated as a group indicating the superset which are made locatable by the HLS ABR master playlist.

10. The non-transient computer-readable medium according to claim 7 wherein the timed metadata stream is provided with version identification stamps.

11. The non-transient computer-readable medium according to claim 7 wherein the enabling the selection of one available media item comprises an application on a client device automatically selecting a preferred media item at least on the basis of a preconfigured preferred media item.

12. A system comprising:
a memory storage; and
a processor coupled to the memory storage, wherein the processor is operative to:

a dedicated Hypertext Transfer Protocol (HTTP) Live Streaming (HLS) adaptive bitrate (ABR) timed metadata stream which is located at a designated location;

populate the dedicated timed metadata stream with timed metadata items, the timed metadata items specifying availability of a particular subset of a superset of all media types which are anticipated as being available at start of a media segment in streaming media playlists, wherein the timed metadata items further specify a change in availability of another particular subset of the superset of all media types which are anticipated as being available at start of another media segment in streaming media playlists, and wherein the timed metadata is synchronized with timeline of the streaming media playlist; and make the timed metadata items available to an application on a client device, wherein the processor being operative to make the timed metadata items available comprises the processor being operative to display, by an application on a client device, a list of available media items at least on the basis of the signal of the change in availability of the particular subset of the superset of all media types which are anticipated as being available in streaming media playlists.

13. The system according to claim 12 wherein the timed metadata items signal that the particular subset of the superset comprises media types which are available at a given time.

14. The system according to claim 12 wherein the designated location comprises at least one of the following:

a location designated by an entry added in an HLS ABR master playlist;

a location designated by an entry added in an HLS ABR media playlist; and a location embedded in a stream of media segments.

15. The system according to claim 14 wherein the HLS ABR master playlist comprises entries designated as a group indicating the superset which is made locatable by the HLS ABR master playlist.

16. The system according to claim 12 wherein the timed metadata stream is provided with version identification stamps.

17. The method according to claim 1 further comprising providing only the particular subset as available options in response to a user of the client device changing the streaming media playlist.

18. The method according to claim 17 wherein providing only the particular subset as available options in response to the user changing the streaming media playlist comprises providing only the particular subset as available options in response to the user selecting a different language, resolution, and bandwidth.

* * * * *